US010846096B1

(12) United States Patent
Chung et al.

(10) Patent No.: US 10,846,096 B1
(45) Date of Patent: Nov. 24, 2020

(54) BATCH PROCESSING OF REQUESTS FOR TRAINED MACHINE LEARNING MODEL

(71) Applicant: A9.com, Inc., Palo Alto, CA (US)

(72) Inventors: Kiuk Chung, Seattle, WA (US); Edward Kandrot, San Jose, CA (US); Scott Michael Le Grand, Soquel, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 16/132,750

(22) Filed: Sep. 17, 2018

(51) Int. Cl.
| G06F 3/06 | (2006.01) |
| G06F 9/38 | (2018.01) |
| G06T 1/60 | (2006.01) |
| G06T 1/20 | (2006.01) |
| G06N 20/00 | (2019.01) |

(52) U.S. Cl.
CPC .......... *G06F 9/3855* (2013.01); *G06F 3/0659* (2013.01); *G06N 20/00* (2019.01); *G06T 1/20* (2013.01); *G06T 1/60* (2013.01)

(58) Field of Classification Search
CPC .............................. G06F 3/0659; G06F 9/3855
USPC ......................................................... 711/167
See application file for complete search history.

(56) References Cited

U.S. PATENT DOCUMENTS

| 7,769,970 | B1* | 8/2010 | Yeh ...................... | H04N 5/4401 711/100 |
| 2013/0297906 | A1* | 11/2013 | Loh ..................... | G06F 13/1642 711/167 |
| 2013/0304450 | A1* | 11/2013 | Tsai .................... | G06F 17/5022 703/14 |
| 2014/0333636 | A1* | 11/2014 | Swift ................... | G06T 15/005 345/505 |
| 2019/0243764 | A1* | 8/2019 | Sakthivel ............ | G06F 12/0815 |

* cited by examiner

*Primary Examiner* — Than Nguyen
(74) *Attorney, Agent, or Firm* — Hogan Lovells US LLP

(57) ABSTRACT

Memory management is provided for processors, such as GPUs used to process data using a trained machine learning model. Requests received to a CPU can be stored to a request queue until the queue is full, or until a timeout value has been reached for periods of lower activity. The requests can then be batched and sent to a GPU as a single message on a single thread. Memory can be pre-allocated, and the trained model loaded into GPU memory once for processing of the relevant batches. The individual requests can be processed by the GPU and the results analyzed to determine at least a subset of results to return to the CPU, which can be provided back as results of the processing.

17 Claims, 5 Drawing Sheets

BATCH PROCESSING OF REQUESTS FOR TRAINED MACHINE LEARNING MODEL

BACKGROUND

The amount of processing performed by computer systems continues to increase with the increase in capability of these systems. For example, processing data in real time using machine learning can require the processing of a large number of floating point values, for example, which can quickly overwhelm a conventional computing system. While graphics processing units (GPUs) have been determined to have advantages in processing such requests, there are inefficiencies in conventional approaches, particularly when processing live data with service agreements with respect to latency and throughput, that require more resource utilization that might otherwise be desired.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of memory for processors executing instructions to process a set of requests. In particular, various approaches provide for the batching of requests for processing by processors such as graphics processing units (GPUs). One or more GPUs can be used to process data using, for example, a trained machine learning model. Requests received to a CPU can be stored to a request queue until a queue flushing criterion is satisfied. A queue flushing criterion might correspond to, for example, the queue being full or until a timeout value having been reached, among other such options. The requests can then be batched and sent to a GPU as a single message on a single thread for storage in pre-allocated memory. The individual requests can be processed by the GPU using a machine learning model stored in GPU memory, and the results analyzed to determine results to return to the CPU, which can be provided back as results of the processing.

Various other functions can be implemented within the various embodiments as well as discussed and suggested elsewhere herein.

Figure 1:
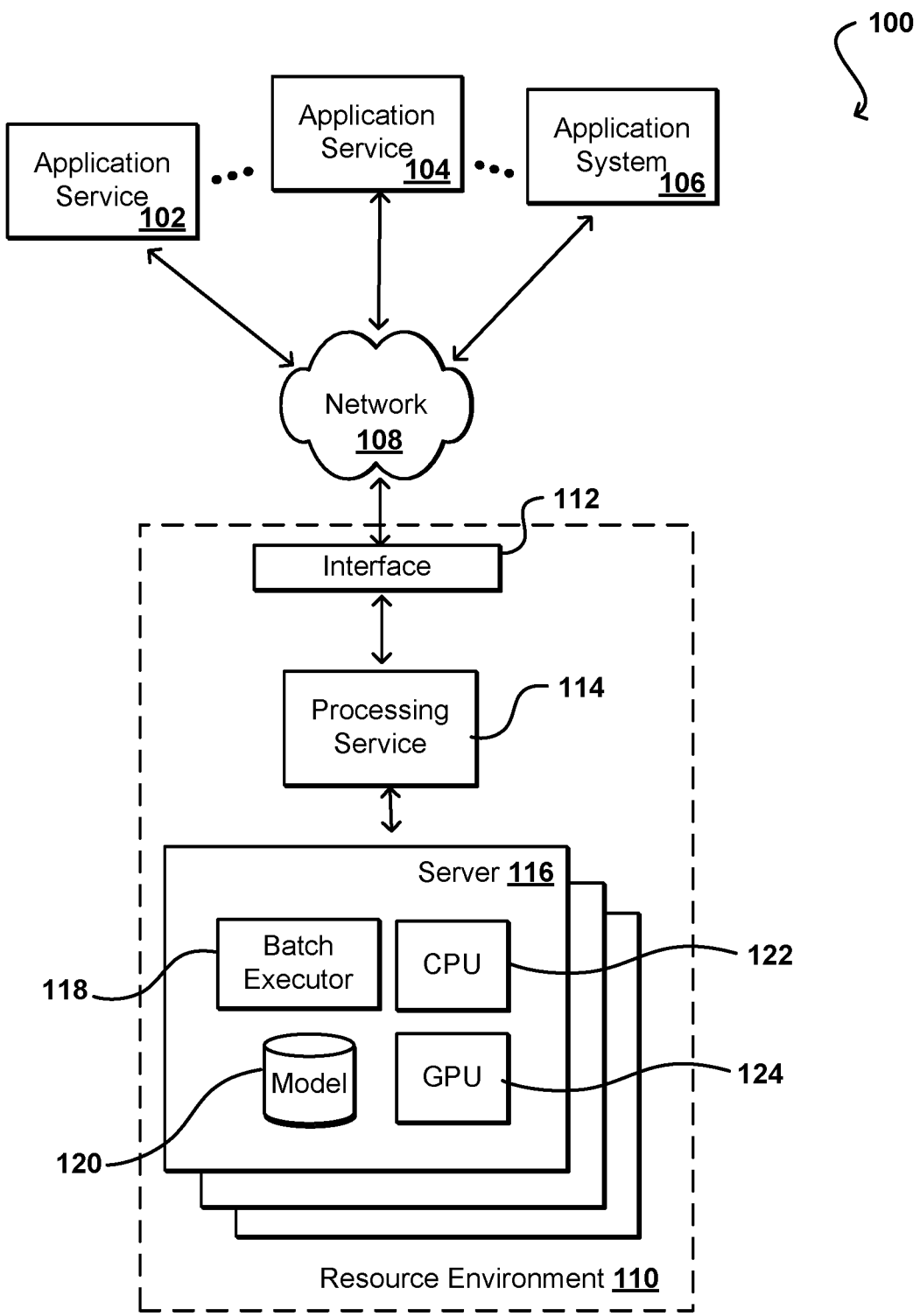
FIG. 1 illustrates an example system implementation that can be utilized in accordance with various embodiments.

FIG. 1 illustrates an example network structure 100 that can be utilized in accordance with various embodiments. Although illustrated as separate components or systems, it should be understood that various components illustrated can be part of the same system or environment in at least some embodiments. In this example, there can be various sources of requests that are submitted for processing by resources of a resource environment 110. The sources can be application services 102, 104 or application systems 106, as well as individual computers, user devices, system processes, and the like. Requests may be received from a large number of sources, each of which are able to at least send data over at least one network 108. The data sent with the various requests can include any appropriate data, which often may be specific to the request such that offline processing cannot practically be performed for at least much of that data. For example, the request might include information for a specific user associated with an individual request. Various types of data may be transmitted by these and other devices as known for such purposes.

The requests transmitted from the various sources can be received to an interface layer 112 of the resource environment 110. As discussed elsewhere herein, the data can be processed for the resource provider or a customer of the resource provider, among other such options. In some embodiments, the interface layer 112 can include components that can route the incoming data to an appropriate service, component, or sub-system of the resource environment 110. This can include, for example routing the data to a processing service 114, or processing manager, that is configured to analyze the request and cause data for the request to be transmitted to an appropriate processing resource, such as a server 116 or other such system or device. In addition to distributing based upon factors such as load and network state, data for certain types of requests may be directed to certain servers based on factors such as the configuration or data stored on different servers.

In some embodiments, the data to be processed for a given request will require application of a machine learning algorithm, trained machine learning model (neural network or otherwise), etc. As used herein, machine learning is intended to encompass various algorithms, models, network, or other approaches that are able to learn or develop relationships or classifications, for example, without explicit or direct programming. In many instances, this will involve the training of a model, for example, using a classified data set, as may be used for supervised learning. Various types of learning, such as deep learning that might utilize convolutional neural networks, for example, are to be considered for purposes of this disclosure as being included within a broader categorization of machine learning. It should be understood that various other computer-based learning or artificial intelligence approaches can be used as well within the scope of the various embodiments. As part of the machine learning-based processing, data might be directed to a server having a copy of the relevant model stored locally or otherwise available. There may also be components, such as graphics processing units (GPUs), on a specific server and configured in such a way as to be optimal for processing data using a specific model. Thus, the data may be directed to a specific server 116 and caused to be processed using the relevant trained model on one or more GPUs 124. The individual requests can be processed by the GPU 124 and the results returned to the relevant source or service endpoint, etc.

With thousands of cores, GPUs are designed to handle parallel workloads and have become popular in deep learning for training neural networks and generating predictions or classifications. machine learning—the set of statistical analysis routines with feedback loops that can do identification While in some cases predictions can be generated offline, certain models might process contextual input features or data that are only available at request-time, and thus require near real-time inference or processing. The service responsible for vending these predictions may then need to perform a real-time feed-forward which, for large and complex models, can be highly compute-intensive and hence better handled by GPUs than central processing units (CPUs). To be free from these restrictions and able to provide users with predictions generated by deep learned models, a real-time inference or processing service 114 can be built on top of various GPUs, or GPU instances. Since GPUs have different performance and work-handling characteristics than CPUs, building GPU-based services can utilize different services that might be utilized for CPU-based processing.

Approaches in accordance with various embodiments can provide accurate, near real-time services without significant degradation in performance or increase in resource requirements. To accomplish this, various approaches provide for the batching of requests for a specific service or to be processed using a specific model, for example. Such an approach can reduce memory requirements, as the model can be loaded once for all requests in a batch rather than separately for each individual request. Further, the requests can be sent in a batch on a single communication thread or transmission rather than separate threads. This batching can further be performed server-side, and transmitted as a single request to the GPU for processing. A timeout value can further be utilized to account for times when there may not be a large volume or frequency of incoming requests, to ensure that any maximum latency requirements are met. If a maximum queue length or timeout value is met, the remaining slots in the queue can be filled with placeholder data, such as identity operands or zero values, for example, and the requests batched into a single batch to be sent to the GPU 124 for processing. Any results from the placeholder slots can then be ignored if the placeholder slot data is processed, or no processing need be performed for those slots, among other such options. Once the requests are pulled from the queue, the queue can be flushed if necessary such that the next received request for the relevant service or model will be the first new request in the queue for the next batch.

Approaches in accordance with various embodiments can also provide for the reduction of memory operations in the critical path of the requests. For a given batch request, the memory needed for processing in the GPU can be pre-allocated before the service starts. Such an approach can help to minimize memory operations, which are the performance bottleneck on GPUs since GPUs are memory-bound and not compute-bound like CPUs. The pre-allocation can be beneficial because it only needs to be performed once for a given batch, and not for individual requests. Further, the allocation enables the trained model to be loaded once for the batch and then used for the individual requests. Further, the allocation provides for the results of the various processing to be aggregated then a subset of top results selected and provided as a result. It should be understood that "top" as used herein can refer to any optimal, preferred, or determined criteria or metrics that can be used to determine which of a set of results to return, as may be based upon scores, rankings, or other such factors.

In the example of FIG. 1, the data for the requests can be received by a designated server 116 and stored in CPU memory for a CPU 122, or other such location. A batch executor 118 can work with the CPU (or execute on the CPU in some embodiments) to cause the requests to be stored to a request queue in CPU memory, then when the queue is full or a timeout value is reached can cause data for the requests in the queue to be batched and sent to the GPU 124 and stored into the pre-allocated GPU memory for processing. The relevant model can be pulled from a model repository 120 and stored into pre-allocated GPU memory as well. After processing, the results can be transferred from the GPU 124 to the CPU 122 in this example, then back to the relevant source. As mentioned in more detail elsewhere herein, in some embodiments the requests may be queued to a shared memory, accessible to the CPU and GPU, and instead of transmitting the messages as a batch, the batch of messages may have responsibility or ownership transferred between the CPU and the GPU, such as to enable the GPU to process the requests once a queue flushing criterion is satisfied.

When processing data with a process such as deep learning, the models can be very large and complex, which can require a significant amount of processing power. The amount of processing power often correlates with how many floating point operations are to be performed within a given amount of time to obtain predictions ore results within a maximum amount of time, or with no more than a maximum amount of latency. As mentioned, GPUs are well suited for such processing, although other processing systems or components can be used as well within the scope of the various embodiments. While at least some processing may be performed offline, in at least some situations the data received with requests will be "live" or "active" data that is only available with the request for which results are to be provided, or otherwise at runtime, and thus must be performed in near real time in at least some embodiments. Examples of live data include time of day of a given request or an address to which the results are to be provided, etc. Running these large, complex models on the GPU can be significantly more efficient than running them on the CPUs. In some instances there is not even enough processing power to process these models on a CPU. Approaches presented herein can help to ensure that maximum performance, or at least improved performance, is received from the GPUs for this near-real time analysis.

Before utilizing batching, approaches in at least some embodiments can attempt to determine values for batch size and timeout values that are optimal for a particular implementation. This can be based upon a modeling of the system in some embodiments, or upon a physical testing procedure in others. Factors such as the network capacity and maximum latency can be utilized to determine the optimal batch size and timeout value. Other factors such as cost and network load can be utilized as well. In some embodiments batch sizes can be in multiples of 64, based on the design of certain GPUs, among other such options. One approach to determining batch size is to start at an initial value, such as 32 requests in a batch, and increase the batch size incrementally (e.g., 64 then 96 then 128) until a performance drop of the GPU is detected based on the number of parallel operations. This may correspond to thrashing of the GPU in some embodiments. The largest batch size that can be utilized without an unacceptable performance drop can be utilized for that particular implementation. The timeout value in at least some embodiments can be determined based at least in part upon any service level agreements (SLAs), such as for a maximum latency. The amount of time needed for processing (i.e., from endpoint to endpoint along the critical path for processing) can be subtracted from the maximum latency in some embodiments to determine the appropriate timeout value in at least some embodiments. In the example network structure 100 of FIG. 1, the batch executor 118 can be configured to manage the queue, including making determinations as to when the queue is full or the timeout value has been reached, and the queued requests should be batched and transmitted to the GPU for processing. The requests of the batch are all being run on the same set of parameters in some embodiments, so there can be significant memory efficiency by processing them together.

And, as discussed, memory operations can become a bottleneck for GPU processing.

The ability to allocate memory once per batch can help to minimize this risk. The risk can further be minimized by making sure to reduce, to the extent possible, the number of memory operations in the critical path of the service. The model is loaded once for the batch before processing begins, and is kept in GPU memory until processing of the batch has completed. That section of memory is managed in such a way that it will not be paged out by a memory management process. For the incoming request data for the batch, the amount of memory can be allocated that will be needed to copy the request data onto the GPU memory. There will be no individual allocations for separately received requests as in conventional approaches. The request data can be copied between the CPU memory and the GPU memory in real time. The contents of the batch are thus flushed from CPU memory to GPU memory through a copy operation, not a memory allocation followed by a copy operation.

Figure 2:
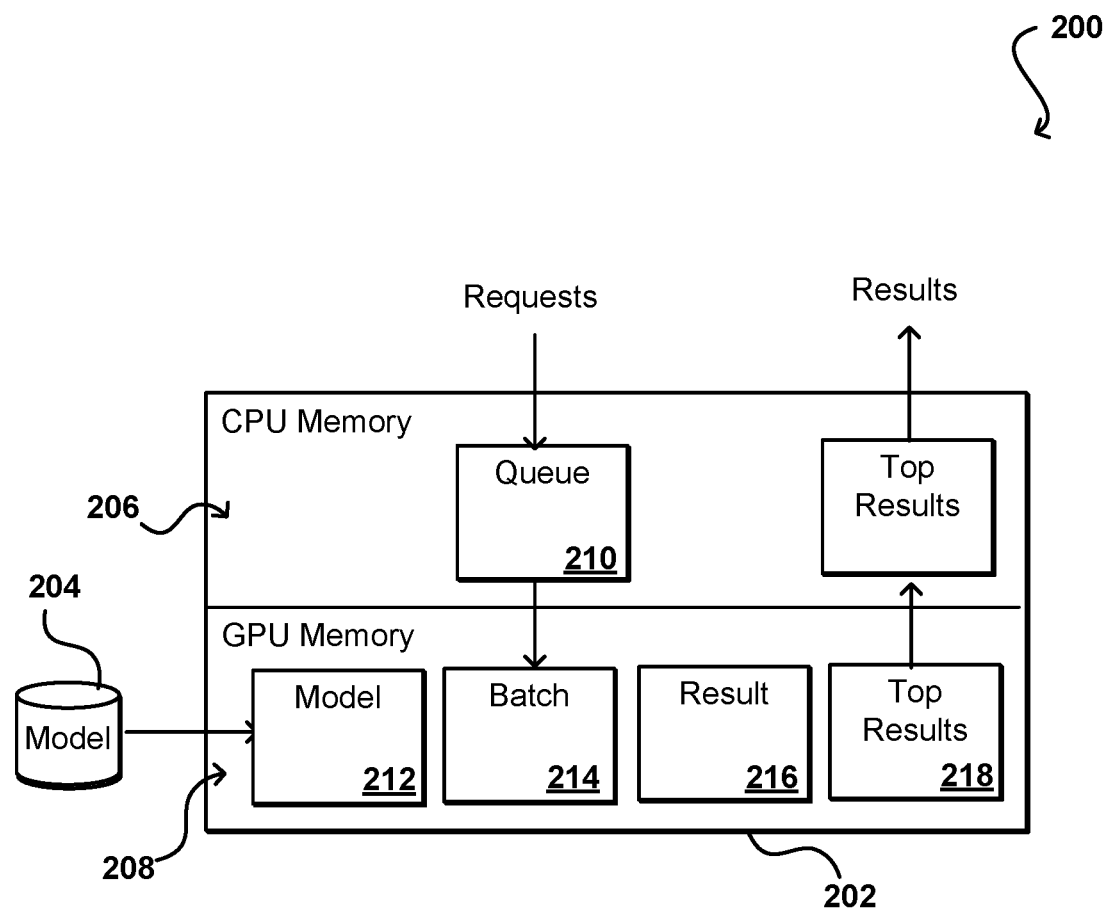
FIG. 2 illustrates processor memory components that can be utilized in accordance with various embodiments.

FIG. 2 illustrates an example memory configuration 200 that can be utilized in accordance with various embodiments. The configuration illustrates portions of CPU memory 206 and GPU memory 208 for a given device 202. As mentioned, however, in some embodiments shared memory can be used that is accessible to both the CPU and GPU, among other such options. As discussed, requests can be received to the CPU memory and stored to a request queue 210. The portions of the GPU to be utilized for processing the requests can be pre-allocated as discussed herein. When a batching criterion is reached or satisfied, such as when the maximum batch size is reached, the queue is full, or a timeout value has been reached, the request data can be batched and transmitted to a batch storage portion 214 of the GPU memory. Separately, the relevant model (or other machine learning algorithm, etc.) can be loaded into a model portion 212 from a model repository 204 or other such location. The loading of the model can occur before any requests are received or processed in at least some embodiments. The model can be used to process the request data for all relevant requests received, with the results for the various requests being written to a result portion 216 of the GPU memory. A set of top results in this example can then be stored to a top results portion 218, where those results can be transferred to a top results portion of the CPU before being transmitted as the results of the processing. At should be understood, however, that other subsets of the results, or the entire set of results, can be returned as well in various embodiments. Although illustrated together, it should be understood that the CPU and GPU could be on different devices in some embodiments, among other such options. As mentioned, the portions of CPU and GPU memory represent pieces of memory that have been pre-allocated for the service. There is no need to call into the operating system (OS) or the GPU to perform an allocation in real time for a batch of requests, which could otherwise be detrimental to the performance of the service.

The copying of data between the CPU and GPU is not as expensive as memory allocations for at least some systems. The data that are in the batches are relatively small compared to the trained model. As mentioned, a batch size might be on the order of 128 vectors, each with sizes between 64 and 1024 bytes. This is very small compared to the size of the model, which might require an allocation of between 500,000 rows and 4,000,000,000 rows, with 64 all to 1024 columns. The copying operation therefore does not require significant time or resources with respect to that for the model. Requests can be copied from the CPU memory where they are stored as they come in from the web service(s) or network. The incoming requests can be copied onto the CPU memory then flushed into the GPU memory when ready to invoke the work on the batch. When invoking the work on the GPU, for a k nearest neighbors (kNN) implementation matrix multiplication can be performed to determine the memory allocation needed. A top k sort or other such operation can then be performed on the aggregated results, taking the top k elements from each of the columns. The top k results can then be copied back to the CPU memory so that it can be read off and sent back to the client (or other source of the requests) over the network.

There may also be multiple GPU implementations in some embodiments. The data can be split across multiple GPUs, broken down by row, column, or another such metric. The results of the processing can then be merged back together to the CPU. The operations of the model and the data can thus be sharded across multiple GPUs to improve capacity without increasing latency.

Figure 3:
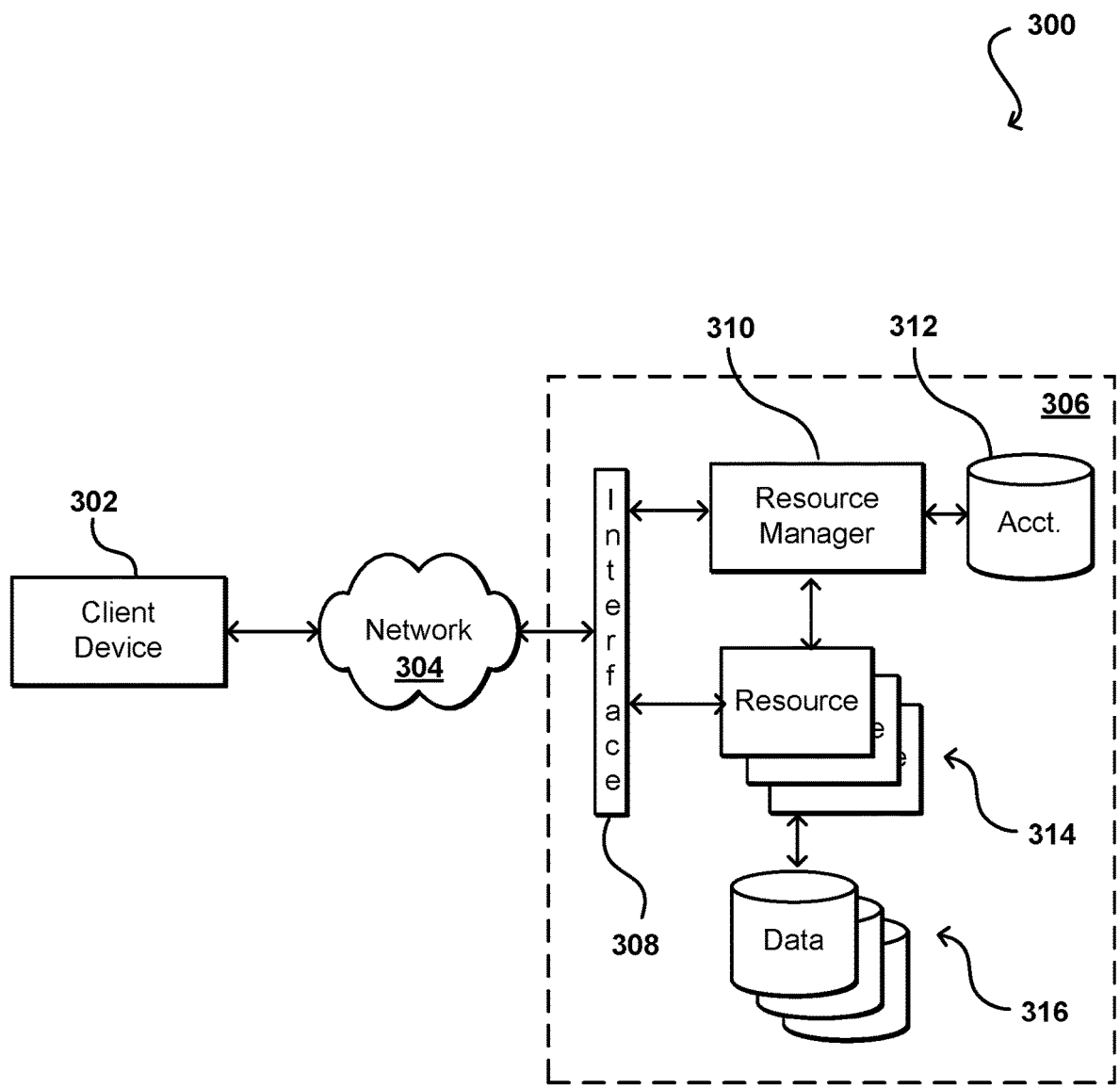
FIG. 3 illustrates an example environment in which various embodiments can be implemented.

FIG. 3 illustrates an example environment 300 in which aspects of the various embodiments can be implemented. In this example a user is able to utilize a client device 302 to submit requests across at least one network 304 to a multi-tenant resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

A real-time inference service can utilize GPUs in some embodiments by examining a relevant service, such as a service that finds the k-nearest neighbors (kNN) given an input vector using a brute force algorithm. Note that, while kNN is used as an example GPU workload, it is treated as a black box algorithm, hence the objective is not to present a state of the art kNN algorithm nor to compare GPUs against CPUs. The focus is on the software and hardware components that enable real-time workloads on GPUs, with the findings and takeaways being applicable to any algorithm that needs to run in real-time, or otherwise benefits from running, on GPUs (e.g. online deep learning inference). The concept of batching is important for effectively utilizing GPUs. Because GPUs have massively parallel architectures, processing single inputs leads to under-utilization. Batching multiple inputs improves GPU utilization which in turn increases throughput and decreases cost-per-request.

Kernels do not have read/write access to host (CPU) memory so data operated on by kernels must first be copied onto the device (GPU) memory in at least some embodiments. When the kernel is done, results must be copied from the device back to the host for the application running on the CPU to access the output. When analyzing an example latency breakdown, more than half of the time is spent copying the model onto the device. Furthermore, allocating and freeing GPU memory is more than 90% of the API call latency. In a real-time service, data copies and memory allocations should be done outside the critical path. A kNN service can pre-allocate all the necessary GPU memory on initialization. The model is static so it is copied from disk to GPU memory once on a pre-activate action. After the results are computed on the GPU, the top results are copied back to the host.

An example kNN service has two main components: the batch-queue and the kNN kernel. The service can perform server-side batching, so batches of n requests are processed together. The batch queue, configured with a size n and a timeout t, queues up requests in blocking fashion. When n requests fill the batch-queue or t has passed (whichever is first), the kNN kernel is launched on the GPU. When the kernel returns, all the requests blocked on the batch queue return with the results from processing the batch. The kNN kernel used by the service uses a single stream per GPU, hence only one instance of the kernel is running at any given time.

As discussed previously, the batch size n determines the marginal cost of a request and the optimal n can be found by examining the latency curve. For a multi-GPU implementation of kNN on four GPUs, the optimal n determined in one example is 64 which yields a kernel latency of 9 ms. For the liveliness of the service, setting an appropriate value for t ensures that the latency SLA is not breached when there are not enough requests to quickly fill the batch-queue. It should be noted that the server-side latency is defined as the activity total time which includes the raw kernel latency, wait time due to server-side batching, and system overhead.

In some embodiments, various accelerators can be utilized in a multi-stream, multi-GPU implementation of the kernel. In such an approach, multiple copies of the same collection can be maintained in GPU memory and multiple batch queues can be operated. This can result in an n-fold increase in throughput. Experimenting with high-speed direct data transfers between GPUs can lead to highly performant multi-GPU algorithms. In one experiment, trading off precision for performance by using half-precision on tensor cores yielded a 4× performance improvement. On the service side, a module to control timeouts in a dynamic fashion can be implemented. Timeouts can be adjusted lower when the TPS is low for quick responses and higher for high TPS to improve GPU utilization by decreasing kernel invocations on partially filled batches. For extremely high values of k the response sizes will be larger and may bottleneck on certain load balancing services. In this case, using a Network Load Balancer (NLB) may yield better performance as NLB can operate at a lower layer in the network stack. Finally, the learnings and results shown in this paper can translate to various GPU-based algorithms and therefore can be used to enable scalable cost-effective real-time inference for large and complex deep learned models.

Figure 4:
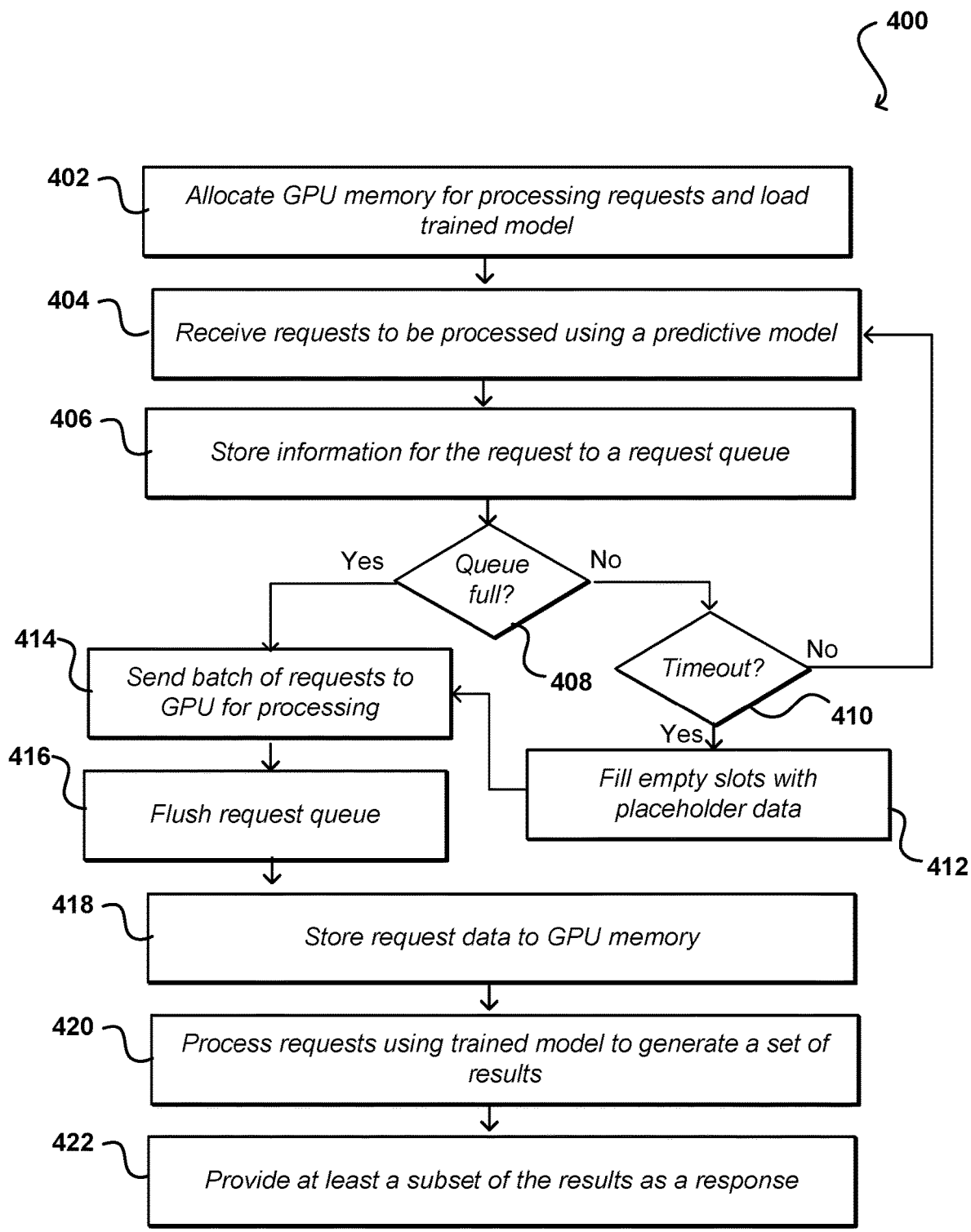
FIG. 4 illustrates an example process for performing batch processing of requests that can be utilized in accordance with various embodiments.

FIG. 4 illustrates an example process 400 for managing memory for a processor, such as a GPU, that can be utilized in accordance with one embodiment. It should be understood for this and other processes discussed herein that there can be additional, alternative, or fewer steps performed in similar or alternative orders, or in parallel, within the scope of the various embodiments unless otherwise stated. In this example, information about the batches of requests to be processed and a trained machine learning model, to be used for the processing, can be used to determine an amount of GPU memory to allocate 402. As mentioned, the trained model, or other algorithm or process, can be loaded into this pre-allocated memory for use in processing batches of requests received for a specific service, for example, that utilizes that trained model. A number of requests are subsequently received 404 that are to be processed using the trained model, such as might relate to a convolutional neural network trained using a specific data set, among other such options. The requests may all relate to a specific service, application, or source, etc. As the requests are received, the requests can be stored 406 to a request queue. In some embodiments, the requests can be received to a CPU and stored in CPU memory, among other such storage locations or repositories. The queue can be monitored or managed by a component or service such as a batch executor. A determination can be made 408 as to whether the request queue is full, or includes a maximum number of concurrently stored requests. If so, the requests can be aggregated into a single batch and sent 414 to a GPU as a single message over a single thread. If the queue is not yet full, but one or more requests are stored in the queue, another determination can be made 410 as to whether a timeout value has been reached. This can include, for example, determining whether a specified maximum queuing duration since the last queue flush, or since the storing of the first currently queued message, was performed. This might be on the order of seconds, milliseconds, or microseconds in at least some embodiments. If the timeout value has not yet been reached then the process can continue as additional requests are received. If the timeout value has been reached then the queued requests can be aggregated into a batch of requests, with placeholders being used to fill 412 any empty slots in the batch as discussed elsewhere herein. Once the batch of requests has been sent, any data still stored in the queue can be flushed 416 to that the queue is available to queue subsequent requests. If shared memory is used, as discussed elsewhere herein, then the requests themselves may not be transferred from CPU memory to GPU memory but instead responsibility, ownership, or access to the request data may be transferred or modified as a result of a queue flushing criterion being satisfied, among other such options discussed and suggested herein.

As mentioned, the batch of requests can be sent to the GPU as a single message over a single thread in this example. An amount of memory needed to store the relevant model, request data, and result data was pre-allocated in GPU memory as discussed above. The request data can then be stored 418 to GPU memory for the batch. As mentioned, the relevant model will already have been loaded to the allocated portion of GPU memory. The data for the individual requests of the batch can be processed 420 to generate a set of results, which can be stored in an allocated portion of GPU memory. As mentioned, this can include providing the data as input to the trained model and receiving a set of output, such as one or more classifications, predictions, and the like. The results can be aggregated or otherwise analyzed together to provide 422 at least a subset of the results as a response to the requests of the batch. As mentioned, this may include a top set of results or other such subset, while in some embodiments the entire set of results may be returned, among other such options. This can include selecting the top overall results from the aggregated set or determining top results for each request and then aggregating the top results, among other such options. This may be based on scores, rankings, confidence values, or other metrics that might be produced by the trained model or machine learning algorithm, etc. The providing of the results can include, for example, transmitting the results back to the CPU, which can then send the results to the appropriate destination. If multiple GPUs are used for processing then the results can be aggregated at the CPU before being sent to the destination.

Figure 5:
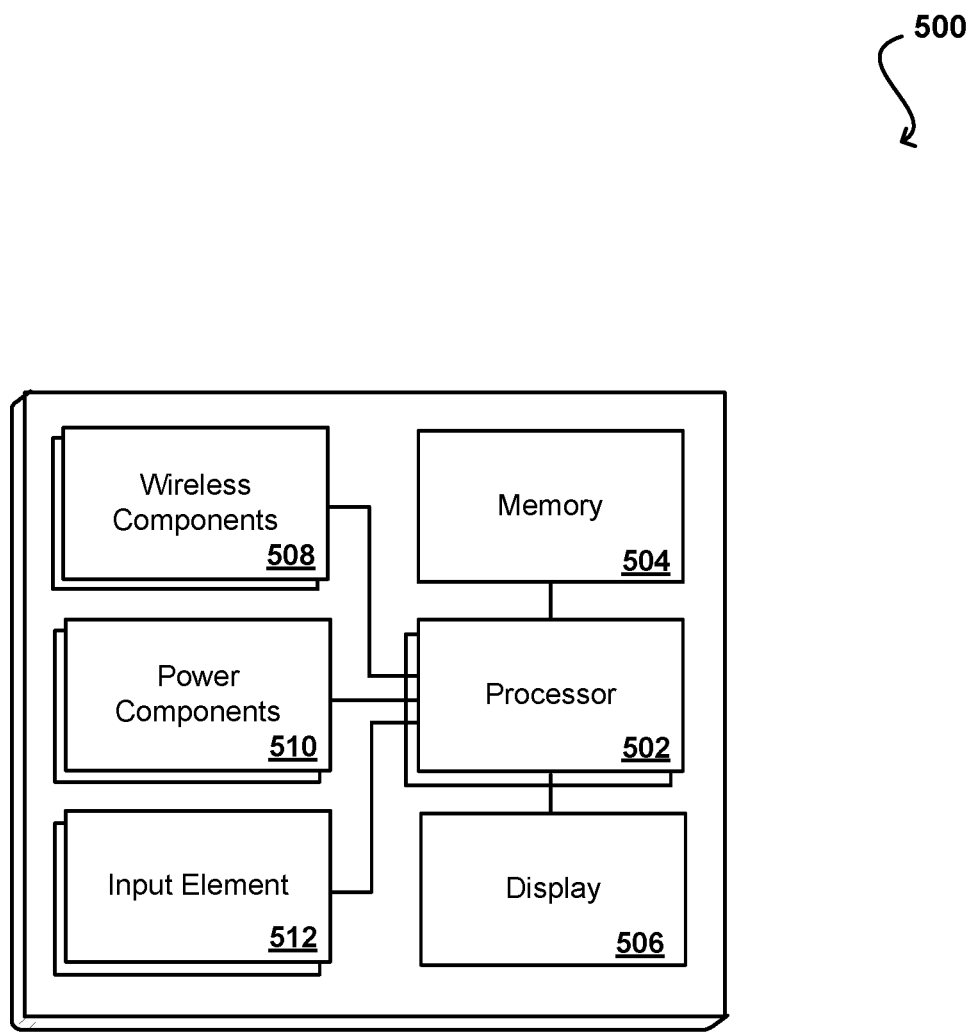
FIG. 5 illustrates example components of a computing device that can be used to implement aspects of the various embodiments.

FIG. 5 illustrates a set of basic components of an electronic computing device 500 that can be utilized to implement aspects of the various embodiments. It should be understood that devices can include client devices, IoT devices, and servers, among many other such options, which may include very different combinations and sub-combinations of these and other components as would be apparent to one of ordinary skill in the art in light of the teachings and suggestions contained herein. In this example, the device includes at least one processing unit 502 for executing instructions that can be stored in a memory device or element 504. As would be apparent to one of ordinary skill in the art, the device can include many types of memory, data storage, or computer-readable media, such as a first data storage for program instructions for execution by the processing unit(s) 502, the same or separate storage can be used for images or data, a removable memory can be available for sharing information with other devices, and any number of communication approaches can be available for sharing with other devices.

The device typically will include some type of display screen 506, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 508, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example device also includes one or more wireless components 508 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 510, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 512 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, to a central processing unit (CPU) of a computer system, a set of requests including data to be processed using a trained machine learning model;
   storing the requests to a request queue in CPU memory;
   determining a maximum number of requests to be concurrently stored to the request queue based at least in part upon a number of requests able to be processed concurrently without a degradation in performance of a graphics processing unit (GPU) of the computer system;
   determining that the maximum number of requests have been concurrently stored to the request queue;
   sending, from the CPU memory to allocated GPU memory for the GPU of the computer system, the requests as a batch, the batch being sent as a single message using a single communications thread;
   processing, using the GPU, data for the requests using a trained machine learning model stored to the allocated GPU memory; and
   sending, to a determined destination, a set of results generated using the trained machine learning model.

2. The computer-implemented method of claim 1, further comprising:
   allocating the allocated GPU memory and storing the trained machine learning model before storing of the requests a subsequent set of requests.

3. The computer-implemented method of claim 1, further comprising:
   using the trained machine learning model stored to the allocated memory for all of the requests of the batch.

4. The computer-implemented method of claim 1, further comprising:
   receiving, from the processing of data for individual requests of the batch, respective results;
   determining top results from each of the respective results for the individual results; and
   aggregating the top results into the set of results.

5. A computer-implemented method, comprising:
   storing received requests to a request queue;
   determining a maximum number of requests to be concurrently stored to the request queue based at least in part upon a number of requests able to be processed concurrently without a degradation in performance of allocated graphics processing unit (GPU) memory;
   determining that a queue flushing criterion has been satisfied based on a determination that the maximum number of requests have been concurrently stored to the request queue;

causing the requests to be sent, as a batch of requests, to be stored to the allocated GPU memory, the batch of requests being sent as a single message using a single communications thread;

processing, using the GPU, data for the requests of the batch with a trained machine learning model stored in the allocated GPU memory;

determining a set of results resulting from the processing; and sending at least a subset of results in response to the received requests.

6. The computer-implemented method of claim 5, further comprising:

determining the queue flushing criterion, the queue flushing criterion corresponding to the maximum number of requests to be concurrently stored to the request queue.

7. The computer-implemented method of claim 5, further comprising:

determining the maximum length of time for one of the requests to be stored to the result queue based at least in part upon a maximum latency requirement for determining the set of results for the requests.

8. The computer-implemented method of claim 7, further comprising:

storing placeholder data in one or more open slots in the batch.

9. The computer-implemented method of claim 5, further comprising:

storing the received requests to the request queue in central processing unit (CPU) memory; and sending the subset of results from the GPU to the CPU before causing the subset to be transmitted to a determined destination.

10. The computer-implemented method of claim 9, further comprising:

determining that the CPU is unable to process data received for at least one of the requests before the receiving of the requests due to insufficient processing power of the CPU.

11. The computer-implemented method of claim 5, wherein the memory in the GPU is allocated once for the batch of requests, the allocated memory being allocated before storing of the requests or the trained machine learning model.

12. The computer-implemented method of claim 5, further comprising:

using the trained machine learning model stored to the allocated memory for processing all the requests of the batch.

13. A system, comprising:

a central processing unit (CPU);

a graphics processing unit (GPU);

shared memory accessible to the CPU and the GPU; and memory including instructions that, when executed by the CPU, cause the system to:

store received requests to a request queue in the shared memory, responsibility for processing the requests in the request queue being granted to the CPU;

determine a maximum number of requests to be concurrently stored to the request queue based at least in part upon a number of requests able to be processed concurrently without a degradation in performance of the GPU;

determine that a queue flushing criterion has been satisfied based on a determination that the maximum number of requests have been concurrently stored to the request queue;

cause responsibility for processing the requests to be transferred, as a batch of requests, to the graphics processing unit (GPU), the batch of requests being transferred as a single message using a single communications thread;

process, using the GPU, data for the requests of the batch using a trained machine learning model stored in the shared memory;

determine a set of results resulting from the processing; and send at least a subset of results in response to the received requests.

14. The system of claim 13, wherein the instructions when executed further cause the system to:

determine the queue flushing criterion, the queue flushing criterion corresponding to the maximum number of requests to be concurrently stored to the request queue.

15. The system of claim 13, wherein the instructions when executed further cause the system to:

enable subsequent requests to be stored to the request queue during the processing of data for the requests.

16. The system of claim 13, wherein the instructions when executed further cause the system to:

allocate the shared memory once for processing batches of received requests, the shared memory being allocated before storing of the requests.

17. The system of claim 13, wherein the instructions when executed further cause the system to:

store the trained machine learning model to the shared memory once for use for all received requests of the batch and at least one subsequent batch.

\* \* \* \* \*